(12) United States Patent
Grillos

(10) Patent No.: US 7,197,852 B2
(45) Date of Patent: Apr. 3, 2007

(54) INTERNALLY STIFFENED COMPOSITE PANELS AND METHODS FOR THEIR MANUFACTURE

(75) Inventor: Emmanuel J. Grillos, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 241 days.

(21) Appl. No.: 10/251,268

(22) Filed: Sep. 20, 2002

(65) Prior Publication Data

US 2004/0055248 A1 Mar. 25, 2004

(51) Int. Cl.
*E04B 1/82* (2006.01)

(52) U.S. Cl. .................. 52/144; 52/309.16; 52/783.18; 52/508; 52/783.1; 52/793.1

(58) Field of Classification Search .................. 52/144, 52/309.14, 309.15, 309.16, 783.11, 783.18, 52/798.1, 505, 508, 783.1, 784.14, 784.15, 52/793.1, 794.1, 309.11, 795.1, 793.11; 428/116
See application file for complete search history.

(56) References Cited

U.S. PATENT DOCUMENTS

| | | | | | |
|---|---|---|---|---|---|
| 3,068,565 A | * | 12/1962 | King et al. | ............... | 228/181 |
| 3,146,148 A | * | 8/1964 | Mitchella et al. | ........... | 156/382 |
| 4,053,667 A | * | 10/1977 | Smith | ........................ | 428/36.1 |
| 4,294,055 A | * | 10/1981 | Andresen | .................... | 52/784.1 |
| 4,416,349 A | * | 11/1983 | Jacobs | ........................ | 181/208 |
| 4,425,980 A | * | 1/1984 | Miles | ........................ | 181/208 |
| 4,635,882 A | * | 1/1987 | SenGupta et al. | .......... | 244/119 |
| 5,815,989 A | * | 10/1998 | Bennenk et al. | ............. | 52/80.1 |
| 6,530,191 B2 | * | 3/2003 | Rieke et al. | ............... | 52/794.1 |

FOREIGN PATENT DOCUMENTS

FR 2633965 * 7/1988

* cited by examiner

*Primary Examiner*—Naoko Slack
*Assistant Examiner*—Chi Q. Nguyen
(74) *Attorney, Agent, or Firm*—Perkins Coie LLP (57) ABSTRACT

Internally stiffened composite panels and associated manufacturing methods. In one embodiment, an internally stiffened composite panel includes a first face sheet, a second face sheet offset from the first face sheet, and at least one core portion sandwiched between the first and second face sheets. In one aspect of this embodiment, the composite panel further includes a stiffener disposed between the first and second face sheets adjacent to the core portion. The stiffener can have a first attachment portion attached to the first face sheet, a second attachment portion attached to the second face sheet, and an intermediate portion extending between the first and second attachment portions. In another aspect of this embodiment, one or both of the first and second attachment portions is configured to engage a fastener, such as a blind fastener, for attaching a part to the composite panel.

34 Claims, 7 Drawing Sheets

INTERNALLY STIFFENED COMPOSITE PANELS AND METHODS FOR THEIR MANUFACTURE

TECHNICAL FIELD

The following disclosure relates generally to composite panels and, more particularly, to composite panels having internal stiffeners that can engage fasteners for attaching parts to the composite panels.

BACKGROUND

Composite materials are often used in the construction of aerospace and other structures because of their high strength-to-weight ratios. Many aircraft, for example, utilize composite materials for both internal airframe components and external skin panels. Composite materials are often used in the form of a panel that can include a core material sandwiched between two opposing face sheets. The face sheets can include one or more plies of a composite fabric material, and the core can include a lightweight material such as a foam or honeycomb material. The resulting combination provides a lightweight panel having relatively high strength and stiffness. The panel can be fastened or otherwise attached to frames or other parts as required to complete a particular assembly.

Figure 1A:
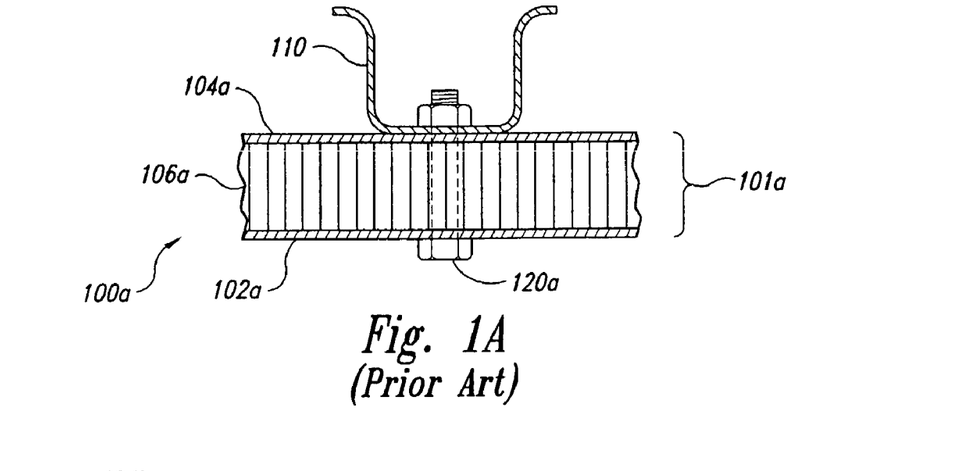
FIGS. 1A–C are cross-sectional views of portions of composite panel assemblies having composite panels configured in accordance with the prior art.
Figure 1B:
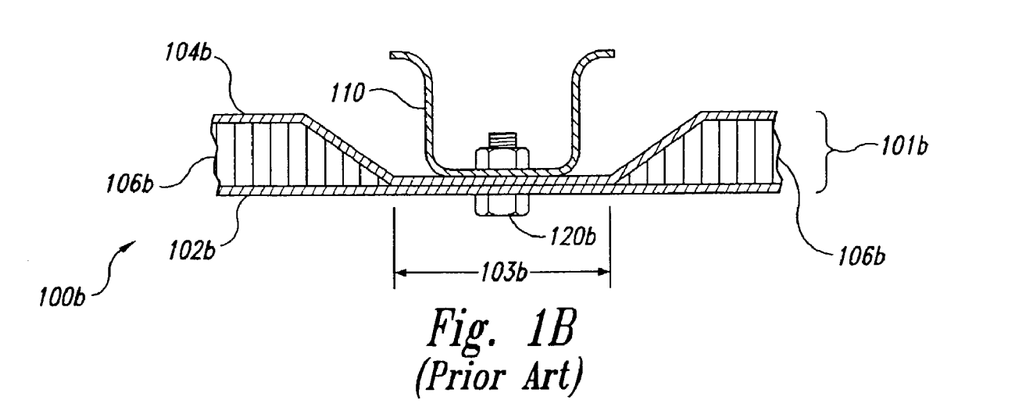
Figure 1C:
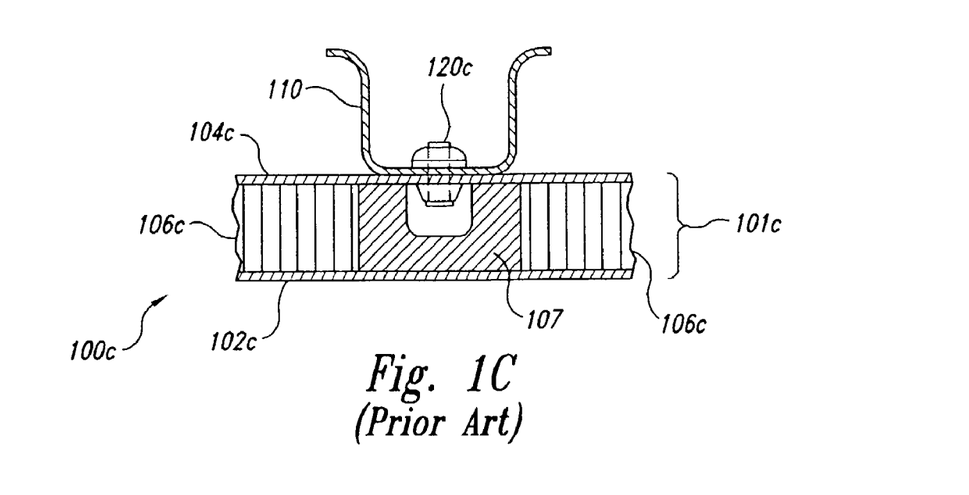

FIGS. 1A–C are cross-sectional views of portions of composite panel assemblies 100a–c having composite panels 101a–c configured in accordance with the prior art. Referring to FIG. 1A, the prior art composite panel 101a includes a first face sheet 102a, a second face sheet 104a offset from the first face sheet 102a, and a core 106a sandwiched between and bonded to the first and second face sheets 102a and 104a. A fastener 120a extends through the composite panel 101a and attaches a part 110 to the composite panel 101a.

One feature of the prior art composite panel 101a is that the fastener 120a extends through holes in both the first and second face sheets 102a and 104a. A disadvantage of this feature is that water or other fluids can leak through the fastener hole if one side of the composite panel 101a is exposed to these fluids. This shortcoming makes the composite panel 101a a poor choice in those applications where a leak-proof panel is desired. In addition, fluids leaking into the composite panel 101a can compromise the structural integrity of the core 106a and/or the bond between the core 106a and the first and second face sheets 102a and 104a.

Another feature of the composite panel 101a is that it has relatively low compression strength through the panel thickness because the core 106a has a tendency to crush under compression load. A disadvantage of this feature is that the fastener 120a cannot develop sufficient pre-load to adequately clamp the part 110 to the panel 101a. To overcome this problem, potting (not shown) can be injected into the composite panel 101a and cured to provide compression strength around the fastener 120a, preventing the core 106a from crushing under fastener pre-load. One downside of this solution, however, is that additional manufacturing effort is required to install the potting. Further, while this solution may reduce the tendency of the core 106a to crush, it does not prevent fluid leakage.

Referring next to FIG. 1B, the prior art composite panel 101b includes a first face sheet 102b, a second face sheet 104b, and core portions 106b sandwiched between the first and second face sheets 102b and 104b. The core portions 106b taper inwardly toward a coreless region 103b where the second face sheet 104b is bonded directly to the first face sheet 102b. A fastener 120b extends through the first and second face sheets 102b and 104b in the coreless region 103b and attaches the part 110 to the composite panel 101b.

One feature of the prior art composite panel 101b is the lack of panel thickness in the coreless region 103b. A disadvantage of this feature is that the ability of the composite panel 101b to withstand large bending moments is substantially reduced. Another disadvantage of the coreless region 103b is that tapering the edges of the core portions 106b to form this region requires additional manufacturing expense. A further disadvantage is the fluid leakage problem described above with reference to FIG. 1A.

Referring now to FIG. 1C, the prior art composite panel 101c includes a first face sheet 102c, a second face sheet 104c, and core portions 106c. Potting 107 has been injected into the space between the core portions 106c and recessed to provide room for a blind fastener 120c. The blind fastener 120c extends through the part 110 and the second face sheet 104c and attaches the part 110 to the composite panel 101c. The blind fastener 120c is referred to as a "blind fastener" because it can be fully installed through the second face sheet 104c with access from only one side of the composite panel 101c.

One feature of the prior art composite panel 101c is that the blind fastener 120c extends only through the second face sheet 104c. While this feature may prevent the fluid leakage problems described above, it has the disadvantage of providing a relatively weak attachment for the part 110. Applying significant loads to the part 110 can cause the second face sheet 104c to deflect and pull away from the potting 107 and/or the core portions 106c in the region adjacent to the blind fastener 120c. Another disadvantage of this approach is that additional manufacturing effort is required to install and recess the potting 107.

SUMMARY

Embodiments of the present invention are directed to composite panel assemblies, such as composite panel assemblies having internally stiffened composite panels. In one embodiment, an internally stiffened composite panel includes a first face sheet, a second face sheet offset from the first face sheet, and at least one core portion sandwiched between the first and second face sheets. The at least one core portion can have a first core face and a second core face opposite the first core face. The first core face can be at least partially bonded to the first face sheet, and the second core face can be at least partially bonded to the second face sheet. In one aspect of this embodiment, the internally stiffened composite panel further includes a stiffener disposed between the first and second face sheets adjacent to the at least one core portion. The stiffener can have a first attachment portion attached to the first face sheet, a second attachment portion attached to the second face sheet and an intermediate portion extending between the first and second attachment portions.

In another embodiment, a composite panel assembly includes the internally stiffened composite panel described above and further includes a part, such as a frame member, fixedly attached to the composite panel. In one aspect of this embodiment, the part is positioned adjacent to the composite panel and proximate to the stiffener. In another aspect of this embodiment, at least one fastener extends through the part and one of the first and second face sheets to engage the stiffener and fixedly attach the part to the composite panel.

In a further embodiment, a method for manufacturing a composite panel assembly includes providing a first face sheet and positioning an attachment portion of a stiffener at least proximate to the first face sheet. In one aspect of this embodiment, the method further includes positioning at least one core portion adjacent to the first face sheet and at least proximate to the stiffener. In another aspect of this embodiment, the method also includes positioning a second face sheet adjacent to the at least one core portion and the stiffener.

In another embodiment of the foregoing method, the attachment portion of the stiffener is a first attachment portion, and the stiffener further includes a second attachment portion offset from the first attachment portion by an intermediate portion. In one aspect of this embodiment, the method further includes positioning the second attachment portion of the stiffener at least proximate to the second face sheet. In another aspect of this embodiment, the method further includes positioning a first adhesive layer between a first core face and the first face sheet, and positioning a second adhesive layer between a second core face and the second face sheet.

DETAILED DESCRIPTION

The following disclosure describes composite panels such as internally stiffened composite panels usable for applications such as aircraft structural components. Certain specific details are set forth in the following description and in FIGS. 2–6 to provide a thorough understanding of various embodiments of the invention. Those of ordinary skill in the relevant art will understand, however, that the invention may have additional embodiments that may be practiced without several of the details described below. In addition, well-known structures and systems often associated with composite materials and composite panel manufacturing have not been shown or described in detail here to avoid unnecessarily obscuring the description of the various embodiments of the invention.

In the drawings, identical reference numbers identify identical or generally similar elements. To facilitate the discussion of any particular element, the most significant digit or digits of any reference number refers to the figure in which that element is first introduced. For example, element 230 is first introduced and discussed in reference to FIG. 2.

In addition, any dimensions, angles and other specifications shown in the figures are merely illustrative of particular embodiments of the invention. Accordingly, other embodiments of the invention can have other dimensions, angles and specifications without departing from the spirit or scope of the present invention.

Figure 2:
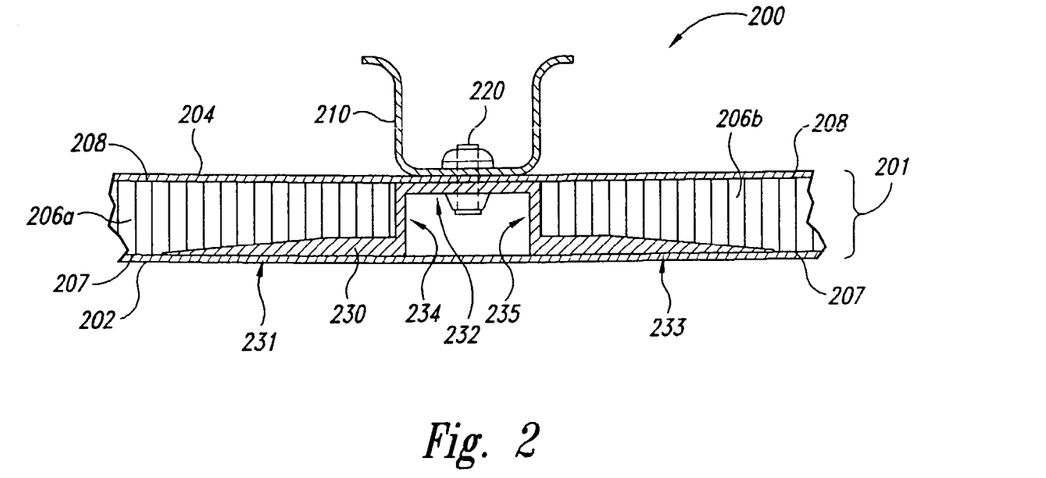
FIG. 2 is a cross-sectional view of a portion of a composite panel assembly having an internally stiffened composite panel configured in accordance with an embodiment of the invention.

FIG. 2 is a cross-sectional view of a portion of a composite panel assembly 200 having an internally stiffened composite panel 201 configured in accordance with an embodiment of the invention. In one aspect of this embodiment, the composite panel 201 includes a first face sheet 202, a second face sheet 204 offset from the first face sheet 202, and a stiffener 230 disposed between the first and second face sheets 202 and 204. Core portions 206 (shown as a core portion 206a and a core portion 206b) can be sandwiched between the first and second face sheets 202 and 204 on opposite sides of the stiffener 230. Each of the core portions 206 can have a first core face 207 and a second core face 208 at least partially bonded to the first and second face sheets 202 and 204, respectively. Further, each of the core portions 206 can be configured to fit snugly against the stiffener 230 for bonding to the stiffener 230.

In another aspect of this embodiment, the stiffener 230 includes a first attachment portion, such as a first flange portion 231, a second attachment portion, such as a cap portion 232, and a third attachment portion, such as a second flange portion 233. The first and second flange portions 231 and 233 can be attached, such as by adhesive bonding, to the first face sheet 202, and the cap portion 232 can be similarly attached to the second face sheet 204. In a further aspect of this embodiment, the stiffener 230 also includes an intermediate portion, such as a first web portion 234 and a second web portion 235, extending from the cap portion 232 to the first and second flange portions 231 and 233, respectively.

In another aspect of this embodiment, the cap portion 232 is configured to receive and engage a fastener 220 for attaching a part 210 to the composite panel 201. In a further aspect of this embodiment, the fastener 220 can be a blind fastener extending only through the part 210, the second face sheet 204, and the cap portion 232. In other embodiments, other types of fasteners, such as a standard fastener requiring access to both ends of the fastener for installation (e.g., a typical nut and bolt arrangement), can be used to attach the part 210 to the composite panel 201. If a standard fastener is used, then access holes (not shown) can be disposed in the first face sheet 202 between the first and second flange portions 231 and 233 to provide access to the end of the fastener that would otherwise be inaccessible. In the illustrated embodiment, the part 210 may be a frame or similar member having a U-shaped cross-section. In other embodiments, other parts having other shapes can be attached to the composite panel 201 in generally the same manner as the part 210.

In one embodiment, the first and second face sheets 202 and 204 can include an exterior titanium foil laminated together with a Ni/Al/graphite layer and a graphite/epoxy layer. In one aspect of this embodiment, the titanium foil can be positioned on the exterior of the composite panel 201 to protect the panel and provide a durable surface. In other embodiments, the first and second face sheets 202 and 204 can include other non-metallic materials, such as fiberglass. In further embodiments, the first and second face sheets 202 and 204 can include metallic materials such as aluminum.

In another aspect of this embodiment, the core portions 206 can include a honeycomb material, such as an aramid honeycomb material like the N636 product offered by the Dupont Corporation. In other embodiments, the core portions 206 can include other types of materials, such as aluminum honeycomb materials or foamed aluminum. In yet other embodiments, the core portions 206 can include other materials such as phenolic honeycomb materials and/or non-metallic foam materials. In a further aspect of this embodiment, the stiffener 230 can include a graphite/epoxy material. In other embodiments, the stiffener 230 can include other materials such as metallic materials, including aluminum, titanium and/or steel.

In one aspect of this embodiment, if the first and second face sheets 202 and 204 and the stiffener 230 include an epoxy matrix, then these parts can be assembled together in an uncured or "green" state, and the assembly can be co-cured to bond the respective parts together. In another embodiment, an adhesive such as an epoxy film adhesive can be applied to the mating surfaces of the respective parts to bond the respective parts together. Heat and/or pressure can be applied to the composite panel 201 to facilitate the curing process and form a strong bond-line. A "fly away" tool can be positioned between the first and second web portions 234 and 235 of the stiffener 230 to prevent the first face sheet 202 from sagging inward during the curing process. This fly away tool can be a water-soluble tool that can be easily removed from the composite panel 201 after the composite panel 201 has fully cured. In another embodiment, other methods can be used to assemble the composite panel 201 without departing from the spirit or scope of the present disclosure.

One feature of embodiments of the invention is that the stiffener 230 is bonded or otherwise attached to both the first and second face sheets 202 and 204. An advantage of this feature is that out-of-plane loads introduced from the part 210 (i.e., loads normal to the second face sheet 204) are effectively distributed over a large portion of the composite panel 201 instead of being reacted by a small region of the second face sheet 204 which can lead to pull-through of the fastener 220. Another feature of embodiments of the invention is that the fastener 220 does not extend completely through the composite panel 201. An advantage of this features is that it reduces or eliminates the likelihood for rain or other fluids to enter the composite panel 201 or compromise the integrity of the core or bond lines within the composite panel 201. Yet another feature of embodiments of the invention is that the cap portion 232 can accommodate a range of positions for the fastener 220. An advantage of this feature is that the fastener 220, and hence the part 210, does not have to be precisely located during the attachment to the composite panel 201.

FIGS. 3A–D are partially exploded isometric views illustrating a manufacturing sequence for the composite panel 201 of FIG. 2 performed in accordance with an embodiment of the invention. In one aspect of this embodiment, the manufacturing sequence that follows assumes that some parts of the composite panel 201 (such as the first and second face sheets 202 and 204, and the stiffeners 230) include composite materials such as graphite/epoxy materials. In other embodiments, the same or a generally similar sequence can be used for other face sheet materials such as metallic materials. In further embodiments, other manufacturing sequences can be used to assemble the composite panel 201.

Figure 3A:
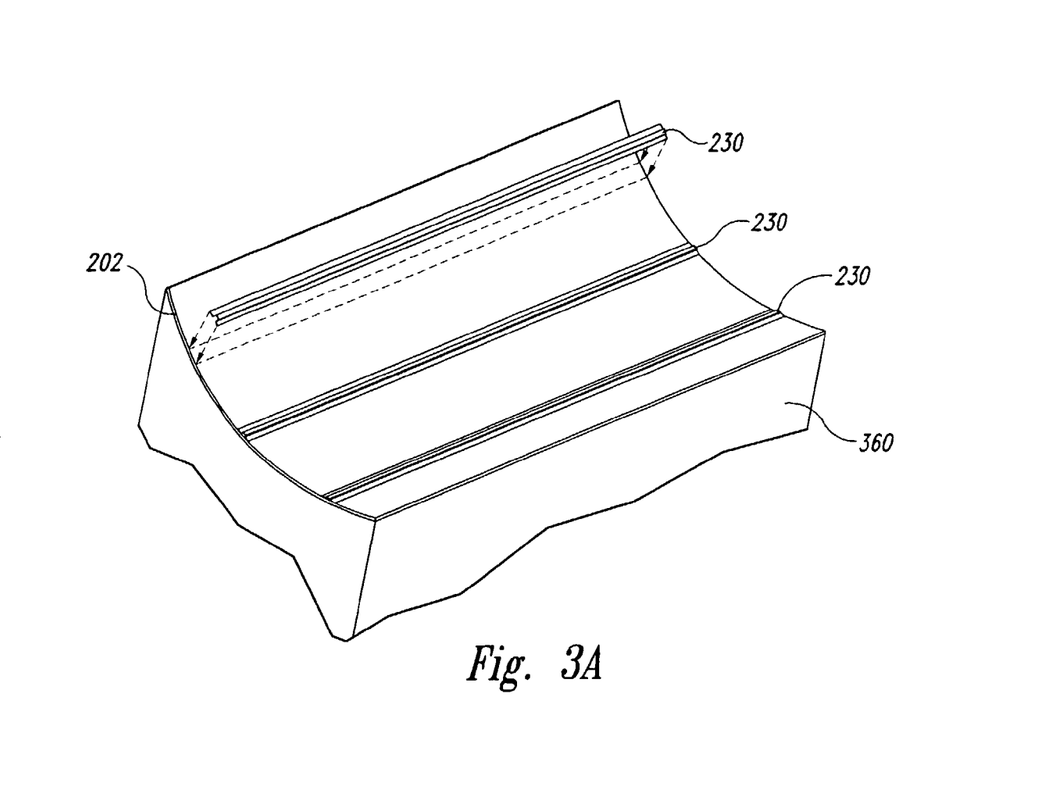
FIGS. 3A–D are partially exploded isometric views illustrating a manufacturing sequence for a composite panel configured in accordance with an embodiment of the invention.

Referring to FIG. 3A, in another aspect of this embodiment, the first face sheet 202 is positioned on a tool such as a form 360 in the uncured state (i.e., a "green" state) so that it will assume the shape of the form 360. For example, in one embodiment, the form 360 can be curved to give the composite panel 201 (FIG. 2) an arcuate shape when finished. In other embodiments, the form 360 can be flat or have other shapes, depending on the desired final shape of the composite panel 201.

In a further aspect of this embodiment, after the first face sheet 202 has been positioned on the form 360, one or more of the stiffeners 230 are positioned on the first face sheet 202. For example, in one embodiment, the stiffeners 230 can be at least generally straight members positioned on the first face sheet 202 in a spaced-apart parallel configuration. The spacing between the stiffeners 230 can be dictated by the structural requirements of the finished panel. In one aspect of this embodiment, the stiffeners 230 can be uncured, such that subsequent co-curing of the first face sheet 202 and the stiffeners 230 causes the epoxy matrix of the stiffeners 230 to bond to the epoxy matrix of the first face sheet 202. In other embodiments, an adhesive such as an epoxy adhesive can be applied to the interface between the stiffeners 230 and the first face sheet 202 to bond the stiffeners 230 to the first face sheet 202 during the curing process.

Figure 3B:
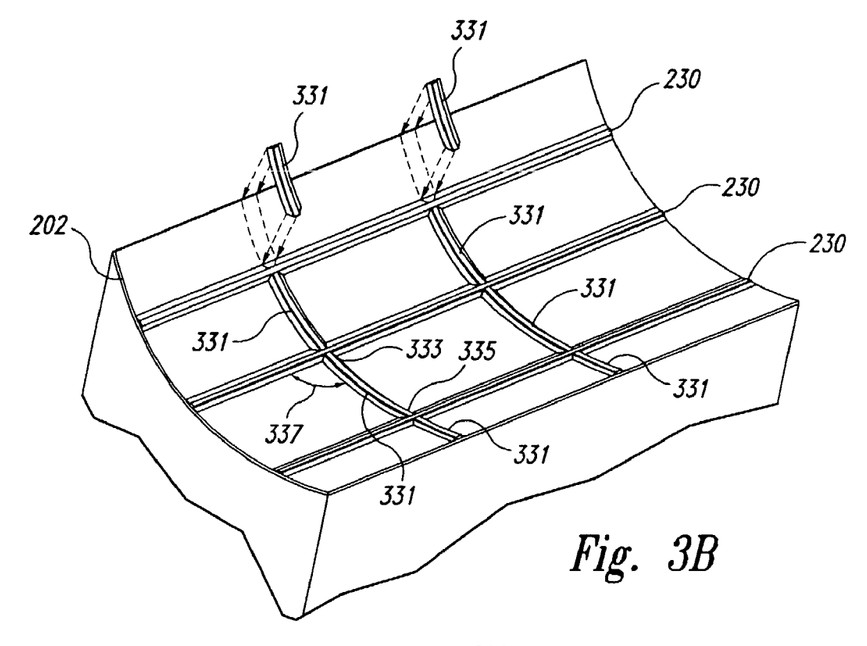

Referring next to FIG. 3B, in one aspect of this embodiment, arcuate second stiffeners 331 are positioned on the first face sheet 202 adjacent to the first stiffeners 230 to give the composite panel 201 additional strength and stiffness. In other embodiments, the second stiffeners 331 can be omitted when not required for structural reasons. In further embodiments, the first stiffeners 230 can be omitted and the second stiffeners 331 can be used exclusively. Such an embodiment may be advantageous in those applications where the longitudinal loads on the panel are minimal.

Each of the second stiffeners 331 can have a first end 333 and a second end 335 opposite the first end 333. At least one of the first and second ends 333, 335 can abut one of the first stiffeners 230 to form a grid pattern of stiffeners on the first face sheet 202. For example, in another aspect of this embodiment, the second stiffeners 331 can be positioned at an angle 337 relative to the first stiffeners 230. In one embodiment, the angle 337 can be from about 85° to about 95°. In other embodiments, the second stiffeners 331 can be positioned at other angles, such as about 45°, relative to the first stiffeners 230. In a further aspect of this embodiment, the second stiffeners 331 can have a cross-sectional shape at least generally similar to the cross-sectional shape of the first stiffeners 230. In other embodiments, the second stiffeners 331 can have other cross-sectional shapes. For example, the second stiffeners 331 can have simpler cross-sectional shapes if they are not used for part attachment or if they are not highly loaded. Examples of cross-sectional shapes for both the first and second stiffeners 230 and 331 in accordance with other aspects of the invention are described below with reference to FIGS. 5A–G. In yet other embodiments, one or more of the second stiffeners 331 can be omitted from the composite panel 201, depending on factors such as applied loads.

Figure 3C:
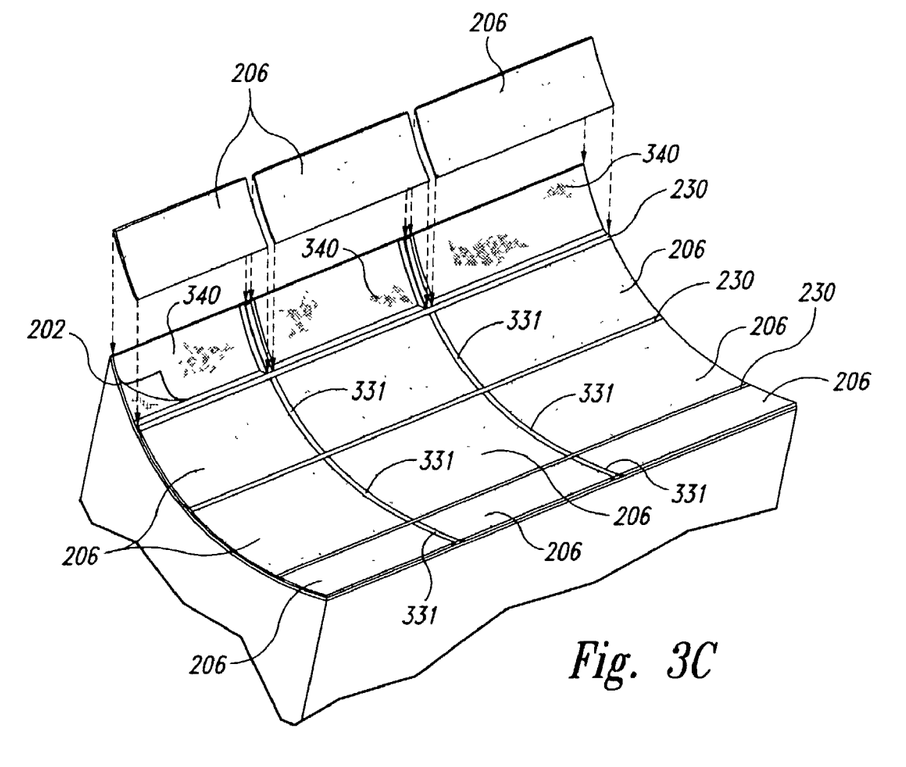

Referring next to FIG. 3C, in one aspect of this embodiment, a plurality of the core portions 206 are positioned on the first face sheet 202 between the first and second stiffeners 230 and 331. In another aspect of this embodiment, adhesive layers 340 can be applied to the first face sheet 202 before positioning the core portions 206 on the first face sheet 202 for bonding the core portions 206 to the first face sheet 202 during the co-curing cycle. The adhesive layer 340 can include a film adhesive such as an epoxy film adhesive. In other embodiments, other types of adhesives can be used to bond the core portions 206 to the first face sheet 202. In further embodiments, the adhesive layers 340 can be omitted and the epoxy present in the face sheet 202 can bond the core portions 206 to the face sheet 202 during the co-curing cycle. In a further aspect of this embodiment, additional adhesive (not shown) can be applied to those portions of the first and second stiffeners 230 and 331 which contact edge regions of the core portions 206 to bond the edge regions of the core portions 206 to the first and second stiffeners 230 and 331.

Figure 3D:
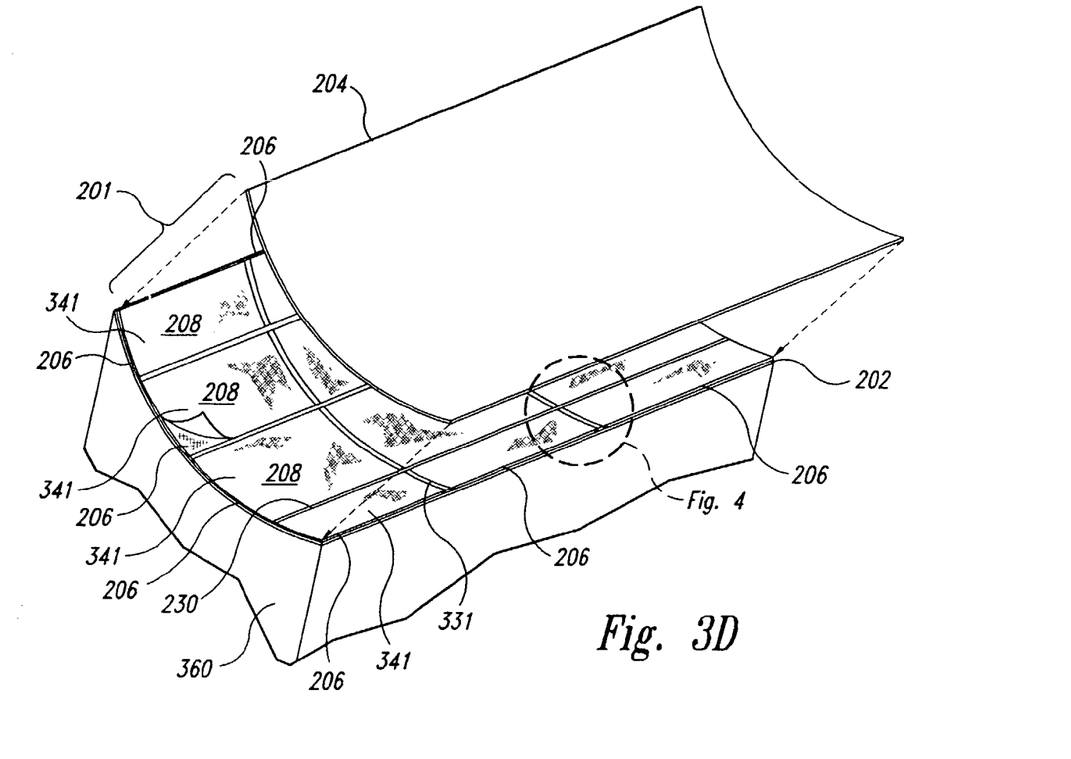

Referring now to FIG. 3D, in one aspect of this embodiment, the second face sheet 204 is positioned over the core portions 206 and the first and second stiffeners 230 and 331 to complete the composite panel 201. Adhesive layers 341 at least generally similar to the adhesive layers 340 shown in FIG. 3C can be applied to at least the second core faces 208 for bonding the second face sheet 204 to the core portions 206 during the co-curing cycle. In other embodiments, the adhesive layers 341 can be omitted and the epoxy of the second face sheet 204 can be used to bond the second face sheet 204 to the core portions 206 during the co-curing cycle.

In the embodiment described above, the uncured elements of the composite panel 201 (i.e., the first and second face sheets 202 and 204, and the first and second stiffeners 230 and 331) can be co-cured to a hardened and usable form by applying uniform pressure to the second face sheet 204 to compress the elements against the form 360 while simultaneously providing heat to the elements. For example, in one embodiment, this heat and pressure can be applied by positioning a vacuum bag (not shown) over the composite panel 201, drawing a vacuum, and placing the assembly in an autoclave or oven. In other embodiments, other methods can be employed to apply the heat and/or pressure required to co-cure the composite panel 201 in a given shape.

As those of ordinary skill in the relevant art will understand, in other embodiments, other methods and/or other manufacturing equipment can be used to manufacture the composite panel 201 without departing from the spirit or scope of the present invention. For example, in one other embodiment, the composite panel 201 can be assembled using a tooling mandrel. In this embodiment, the second face sheet 204 can be positioned against the mandrel, and the other elements of the composite panel 201 (i.e., the first and second stiffeners 230 and 331, the core portions 206, and the first face sheet 202) can be assembled on top of the second face sheet 204. In one aspect of this embodiment, the tooling mandrel can be a rotating cylindrical mandrel, and the first and second face sheets 202 and 204 can be applied using a moving fiber-placement device to wind pre-impregnated graphite/epoxy strands over the mandrel and/or the respective elements of the composite panel 201.

Figure 4:
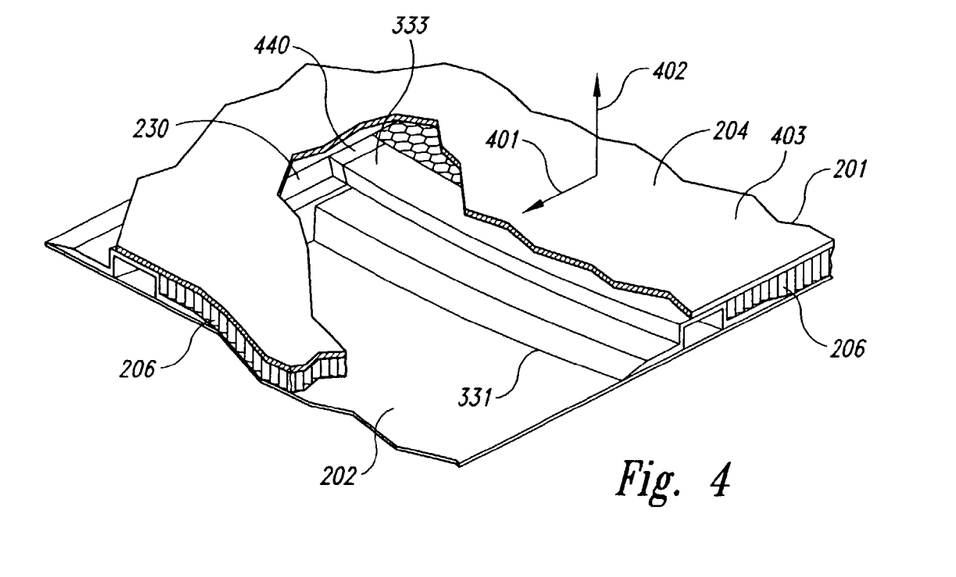
FIG. 4 is a partially cut-away enlarged isometric view of a portion of the composite panel of FIG. 3D.

FIG. 4 is an enlarged cut-away isometric view of a portion of the composite panel 201 of FIG. 3D configured in accordance with an embodiment of the invention. For purposes of illustration, the composite panel 201 is shown fully assembled with parts of the second face sheet 204 and the core portions 206 cut away to show how the second stiffener 331 joins the first stiffener 230. In one aspect of this embodiment, the first end 333 of the second stiffener 331 is configured to at least partially abut the first stiffener 230 and is bonded to the first stiffener 230 with a suitable adhesive such as an epoxy adhesive. In addition, any gaps between the first end 333 of the second stiffener 331 and the first stiffener 230 can be filled, for example, by a plug member such as a plug member 440, to prevent the second face sheet 204 from sagging into these gaps during the co-curing cycle. In other embodiments, other methods can be used to join the second stiffener 331 to the first stiffener 230. For example, in another embodiment, the first and second stiffeners 230 and 331 can be preassembled in a lattice-type structure before they are positioned on the first face sheet 202. In one aspect of this embodiment, the first and second stiffeners 230 and 331 can be joined together by fasteners or other media during the preassembly. In yet other embodiments, such as lightly loaded embodiments, the second stiffener 331 can be separate from the first stiffener 230, or the second stiffener 331 can be omitted.

In a further aspect of this embodiment, the second face sheet 204 has an exterior surface 403 defining a first direction 401 and a second direction 402. The first direction 401 can be parallel to the surface 403, and the second direction 402 can be perpendicular to the surface 403. In another aspect of this embodiment, the first and second face sheets 204 and 202 can provide structural strength parallel to the first direction 401, while the core portions 206 can offset the first face sheet 202 from the second face sheet 204 in the second direction 402. Accordingly, the foregoing arrangement of face sheet-core-face sheet can provide a relatively strong and lightweight structural panel. The addition of the first and second stiffeners 230 and 231 can further enhance the structural capability of the composite panel 201.

Figure 5A:
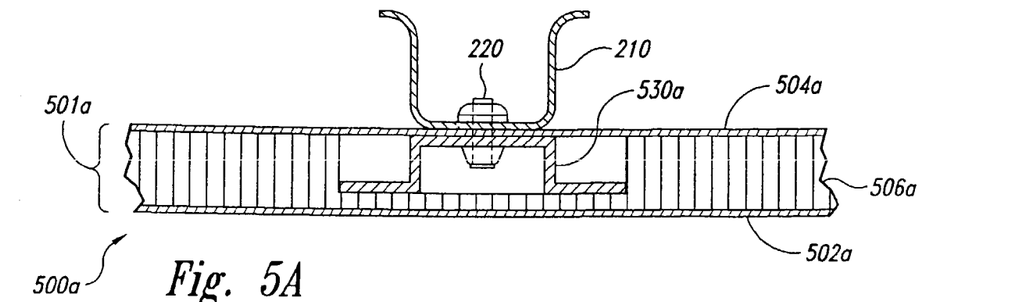
FIGS. 5A–G are cross-sectional views of composite panel assemblies having composite panels configured in accordance with other embodiments of the invention.

FIGS. 5A–G are cross-sectional views of composite panel assemblies 500a–g having composite panels 501a–g configured in accordance with other embodiments of the invention. Referring to FIG. 5A, in one embodiment, the composite panel 50a includes a first face sheet 502a, a second face sheet 504a offset from the first face sheet 502a, and a core portion 506a sandwiched between the first and second face sheets 502a and 504a. A channel 550 can be machined or otherwise formed in the core portion 506a to make room for a low-profile stiffener 530a. In one aspect of this embodiment, the stiffener 530a can be generally similar to the stiffener 230 of FIG. 2. However, the stiffener 530a has a lower profile and is fixedly attached, such as by bonding, to only the second face sheet 504a. Accordingly, the fastener 220 can attach the part 210 to the composite panel 501a in a manner at least generally similar to the manner described above with reference to FIG. 2. Although the composite panel 501a may not be as strong as the composite panel 201 described above with reference to FIG. 2, the composite panel 501a may be desirable in lightly loaded structures where panel weight is a factor.

Figure 5B:
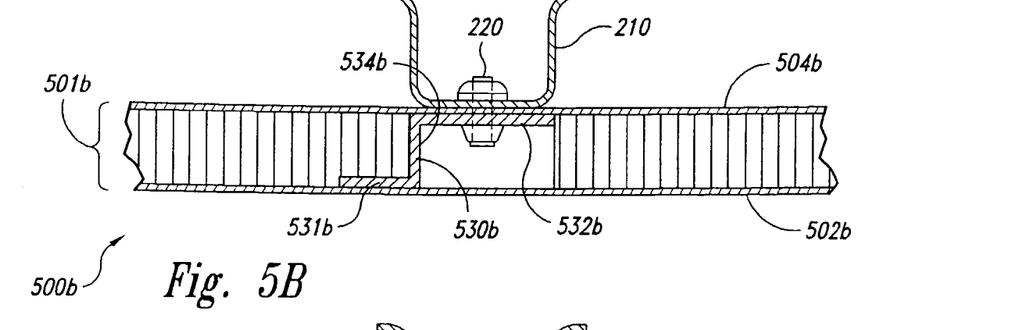

Referring next to FIG. 5B, in one embodiment, the composite panel 501b includes a Z-section stiffener 530b having a first attachment portion such as a first flange portion 531b attached to a first face sheet 502b, and a second attachment portion such as a second flange portion 532b attached to a second face sheet 504b. An intermediate portion such as a web portion 534b can extend between the first and second flange portions 531b and 532b. Accordingly, the fastener 220 can fixedly attach the part 210 to the composite panel 501b in a manner at least generally similar to the manner described above with reference to FIG. 2.

Figure 5C:
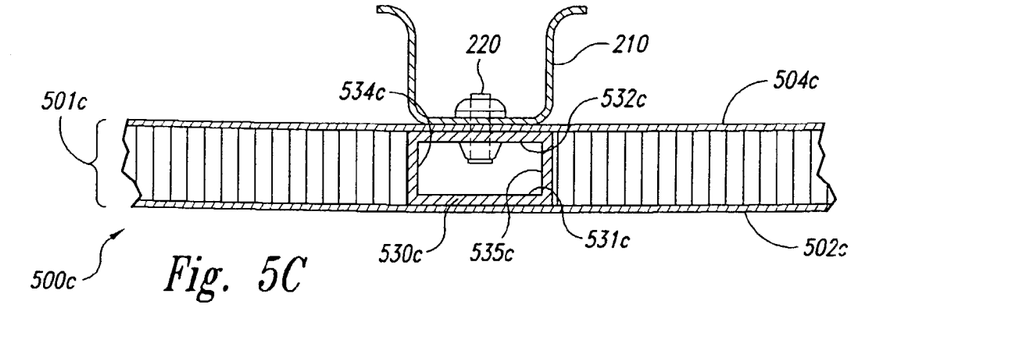
Figure 5D:
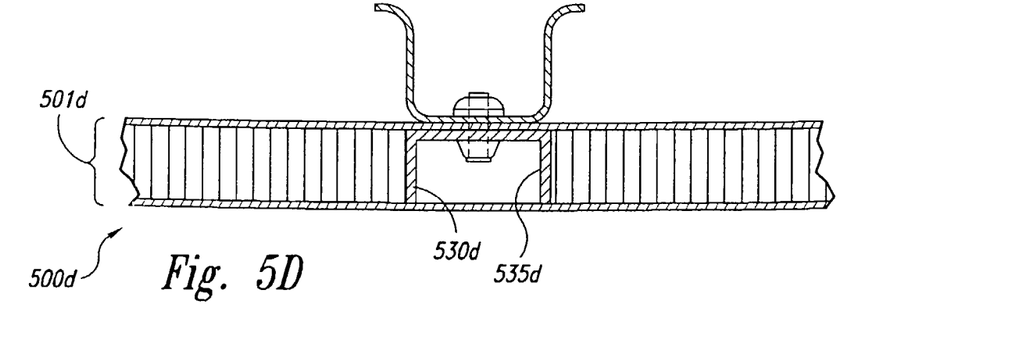
Figure 5E:
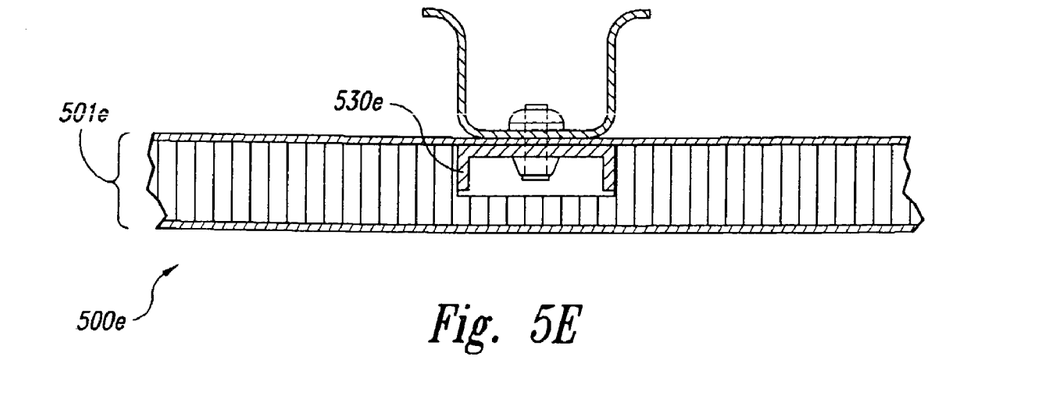
Figure 5F:
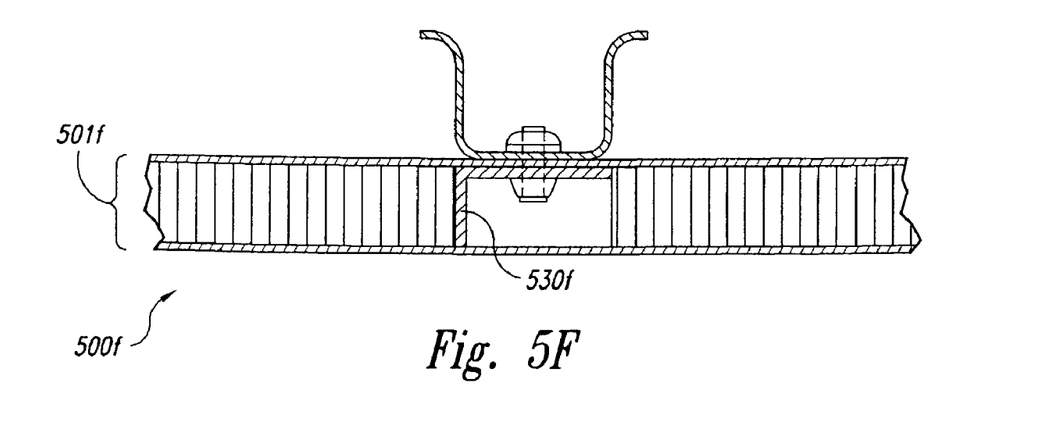

Referring next to FIG. 5C, in one embodiment, the composite panel 501c includes a closed-section stiffener 530c having a first attachment portion such as a first flange portion 531c attached to a first face sheet 502c, and a second attachment portion such as a second flange portion 532c attached to a second face sheet 504c. An intermediate portion such as a first web portion 534c, and a second web portion 535c offset from the first web portion 534c, extends between the first and second flange portions 531c and 532c, defining an enclosed cross-sectional shape. Accordingly, the fastener 220 can fixedly attach the part 210 to the composite panel 501c in a manner at least generally similar to the manner described above with reference to FIG. 2.

Figure 5G:
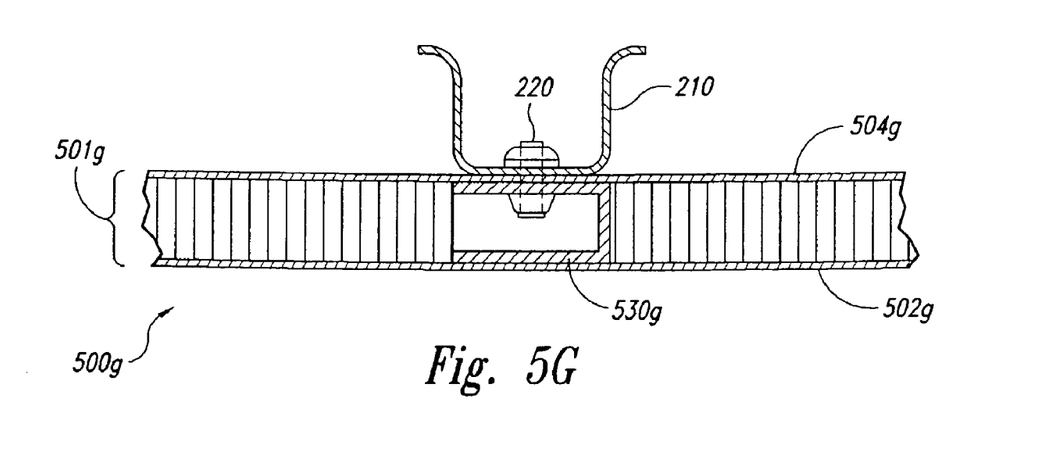

Referring now to FIGS. 5D–G, collectively, these figures illustrate embodiments of composite panels 501d–g having stiffeners 530d–g, respectively, that are variations of the stiffeners described above. For example, in FIG. 5D the stiffener 530d is similar to the stiffener 530c of FIG. 5C, except that the first flange portion 531c is omitted. Similarly, referring to FIG. 5E, the stiffener 530e is similar to the stiffener 530d, except that the stiffener 530e has a lower profile, similar to the stiffener 530a of FIG. 5A. Further, referring to FIG. 5F, the stiffener 530f is similar to the stiffener 530d of FIG. 5D, except that a web portion 535d is omitted. Referring to FIG. 5G, the stiffener 530g is similar to the stiffener 530c of FIG. 5c, except that the first web portion 534c is omitted.

One feature of embodiments of the invention as illustrated above in FIGS. 5A–G is that the stiffeners can have a wide array of configurations. An advantage of this feature is that a particular stiffener can be selected based on the structural requirements of the panel into which it is incorporated. For example, for lightly loaded panels where weight is a factor, a stiffener such as 530e or 530f may be an appropriate selection. For highly loaded panels, a stiffener such as 530b, 530c or 530g may be more appropriate.

Another feature of embodiments of the invention is that in selected configurations, the stiffener can provide a conduit or enclosed passageway through the respective composite panel. For example, both the stiffener 530c of FIG. 5C and the stiffener 230 shown in FIG. 2 provide at least generally closed passageways extending through their respective composite panels. One advantage of this feature is that these passageways can be used as conduits for various systems such as electrical wiring and/or control cables, or liquids such as hydraulic fluid or fuel, depending on the particular application.

Figure 6:
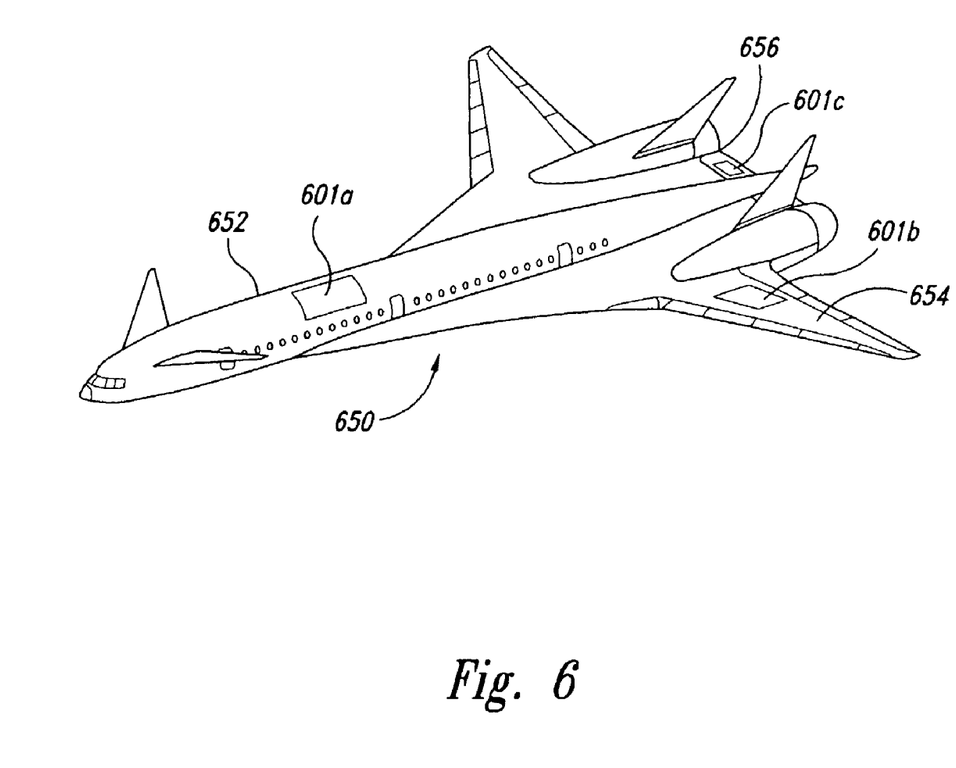
FIG. 6 is an isometric view of an aircraft having a composite panel configured in accordance with an embodiment of the invention.

FIG. 6 is an isometric view of an aircraft 650 having composite panels 601a–c configured in accordance with embodiments of the invention. In one aspect of this embodiment, the aircraft 650 includes a fuselage 652 and a wing 654 fixedly attached to the fuselage 652. In another aspect of this embodiment, the fuselage 652 includes a composite panel 601a, and the wing 654 includes a composite panel 601b. The composite panels 601a, b can be at least generally similar in construction as the composite panel 201 described above with reference to FIGS. 2–3D. In a further aspect of this embodiment, a control surface, such as an elevator 656, can also include a composite panel 601c that is at least generally similar to the composite panel 201. In any of the composite panels 601a–c, fasteners can extend through one or both of the first and second stiffeners 230 and 331 to attach the respective panel to an adjacent internal airframe structure. In other embodiments, composite panels at least generally similar to the composite panel 201 can be used as internal airframe structural members.

From the foregoing, it will be appreciated that specific embodiments of the invention have been described herein for purposes of illustration, but that various modifications may be made without deviating from the spirit and scope of the invention. For example, although embodiments of the invention have been described above with reference to composite panels employing nonmetallic face sheets, in other embodiments, the respective face sheets can be made from metallic materials such as aluminum or titanium. In addition, while various embodiments of the invention may be well-suited for aerospace applications such as aircraft, in other embodiments, composite panels in accordance with the invention can be used in the construction of other structures such as marine and land vehicle structures or fixed structures. Accordingly, the invention is not limited, except as by the appended claims.

I claim:

1. A composite panel comprising:
   a first face sheet;
   a second face sheet offset from the first face sheet;
   a stiffener disposed between the first and second face sheets, the stiffener having a first attachment portion attached to the first face sheet, a second attachment portion attached to the second face sheet, and an intermediate portion extending between the first and second attachment portions;
   a first core portion positioned between the first and second face sheets on a first side of the stiffener, wherein at least a first portion of the stiffener is bonded to the first core portion; and
   a second core portion positioned between the first and second face sheets on a second side of the stiffener opposite to the first side of the stiffener, wherein at least a second portion of the stiffener is bonded to the second core portion, and wherein the stiffener defines an open passageway extending between the first and second core portions.

2. The composite panel of claim 1 wherein the stiffener further includes a third attachment portion attached to the first face sheet, the third attachment portion being offset from the second attachment portion and spaced apart from the first attachment portion.

3. The composite panel of claim 1 wherein the first attachment portion includes a first flange portion, wherein the second attachment portion includes a cap portion, and wherein the stiffener further includes a second flange portion attached to the first face sheet, the second flange portion being offset from the cap portion and spaced apart from the first flange portion, further wherein the intermediate portion includes a first web portion and a second web portion offset from the first web portion, wherein the first web portion extends between the first flange portion and the cap portion, and wherein the second web portion extends between the second flange portion and the cap portion.

4. The composite panel of claim 1 wherein the first attachment portion includes a flange portion, wherein the second attachment portion includes a cap portion, and wherein the intermediate portion includes a web portion extending between the flange portion and the cap portion.

5. The composite panel of claim 1 wherein the first face sheet is a first arcuate panel, the second face sheet is a second arcuate panel, and the stiffener is an elongate straight member extending between the first and second face sheets.

6. The composite panel of claim 1 wherein the second attachment portion is configured to receive and engage a fastener to fixedly attach a part to the composite panel.

7. The composite panel of claim 1 wherein the second attachment portion is configured to receive and engage a blind fastener to fixedly attach a part to the composite panel.

8. The composite panel of claim 1 wherein the at least one core portion includes a honeycomb material having a first core face and a second core face opposite the first core face, wherein the first core face is at least partially bonded to the first face sheet and the second core face is at least partially bonded to the second face sheet.

9. The composite panel of claim 1 wherein the first and second face sheets include a graphite/epoxy material.

10. The composite panel of claim 1 wherein the first attachment portion is adhesively bonded to the first face sheet, and wherein the second attachment portion is adhesively bonded to the second face sheet.

11. The composite panel of claim 1, further comprising at least one adhesive layer disposed between the at least one core portion and one of the first and second face sheets, wherein the adhesive layer adhesively bonds the at least one core portion to the one of the first and second face sheets.

12. The composite panel of claim 1 wherein the stiffener is a first stiffener, and wherein the composite panel further comprises a second stiffener wherein the first face sheet is a first arcuate panel, the second face sheet is a second arcuate panel, the first stiffener is a straight member extending between the first and second face sheets, and the second stiffener is an arcuate member extending between the first and second face sheets.

13. The composite panel of claim 12 wherein the second stiffener is an arcuate member extending between the first and second face sheets at an angle from about 85 degrees to about 95 degrees relative to the first stiffener.

14. The composite panel of claim 1 wherein the stiffener is a first stiffener, and wherein the composite panel further comprises a second stiffener wherein the first stiffener has a first cross-sectional shape and the second stiffener has a second cross-sectional shape, wherein the first and second cross-sectional shapes are at least generally the same.

15. The composite panel of claim 1 wherein the stiffener is a first stiffener, and wherein the composite panel further comprises a second stiffener wherein at least one of the first and second stiffeners is configured to receive and engage a fastener to attach a part to the composite panel.

16. The composite panel of claim 1 wherein the stiffener is a first stiffener, and wherein the composite panel further comprises a second stiffener wherein the first stiffener further includes a third attachment portion and an intermediate portion, the third attachment portion being offset from the first attachment portion, and the intermediate portion extending between the first and third attachment portions, wherein the first attachment portion is attached to the first face sheet, and the third attachment portion is attached to the second face sheet.

17. The composite panel of claim 1 wherein the stiffener is a first stiffener, and wherein the composite panel further comprises a second stiffener wherein the first stiffener further includes a third attachment portion and an intermediate portion, the third attachment portion being offset from the first attachment portion, and the intermediate portion extending between the first and third attachment portions, wherein the first attachment portion is attached to the first face sheet, and the third attachment portion is attached to the second face sheet, and wherein at least one of the first and second attachment portions is configured to receive and engage a fastener to attach a part to the composite panel.

18. The composite panel of claim 1 wherein the stiffener is a first stiffener, and wherein the composite panel further comprises a second stiffener wherein the first stiffener further includes a third attachment portion and an intermediate portion, the third attachment portion being offset from the first attachment portion, and the intermediate portion extending between the first and third attachment portions, wherein the first attachment portion is attached to the first face sheet, and the third attachment portion is attached to the second face sheet, and wherein the first attachment portion includes a first flange portion, the third attachment portion includes a second flange portion, and the intermediate portion includes a web portion extending between the first and second flange portions.

19. The composite panel of claim 1 wherein the stiffener is a first stiffener, and wherein the composite panel further comprises a second stiffener wherein the first stiffener further includes a third attachment portion and an intermediate portion, the third attachment portion being offset from the first attachment portion, and the intermediate portion extending between the first and third attachment portions, wherein the first attachment portion is attached to the first face sheet, and the third attachment portion is attached to the second face sheet, and wherein the first attachment portion includes a flange portion, the third attachment portion includes a cap portion, and the intermediate portion includes a web portion extending between the flange portion and the cap portion.

20. A composite panel comprising:
a first face sheet;
a second face sheet offset from the first face sheet;
at least one core portion extending between the first and second face sheets; and
a stiffener disposed between the first and second face sheets at least proximate to the at least one core portion, the stiffener having a first attachment portion attached to the first face sheet, a second attachment portion attached to the second face sheet, and an intermediate portion extending between the first attachment portion and the second attachment portion, wherein the intermediate portion includes a first web portion and a second web portion, the second web portion being spaced apart from the first web portion to define an enclosed passageway extending through the stiffener.

21. A composite panel assembly comprising:
a composite panel including:
    a first face sheet;
    a second face sheet offset from the first face sheet;
    a stiffener disposed between the first and second face sheets, the stiffener having at least one attachment portion attached to one of the first and second face sheets;
    a first core portion positioned between the first and second face sheets on a first side of the stiffener, wherein at least a first portion of the stiffener is bonded to the first core portion; and
    a second core portion positioned between the first and second face sheets on a second side of the stiffener opposite to the first side of the stiffener, wherein at least a second portion of the stiffener is bonded to the second core portion, and wherein the stiffener defines an open passageway extending between the first and second core portions;
a part positioned at least proximate to the composite panel and adjacent to the stiffener; and
at least one fastener engaging the part and extending through one of the first and second face sheets and the stiffener, wherein the at least one fastener engages the stiffener to attach the part to the composite panel.

22. The composite panel of claim 21 wherein the at least one attachment portion of the stiffener includes a first flange portion attached to the first face sheet, wherein the stiffener further includes a cap portion and a second flange portion, the cap portion being offset from the first flange portion, and the second flange portion being offset from the cap portion and spaced apart from the first flange portion, the second flange portion being attached to the first face sheet.

23. The composite panel of claim 21 wherein the at least one attachment portion of the stiffener includes a first flange portion attached to the first face sheet, wherein the stiffener further includes a cap portion and a second flange portion, the cap portion being offset from the first flange portion, the second flange portion being offset from the cap portion and spaced apart from the first flange portion, and the second flange portion being attached to the first face sheet, and wherein the stiffener further includes a first web portion and a second web portion, the first web portion extending between the first flange portion and the cap portion, and the second web portion extending between the cap portion and the second web portion.

24. The composite panel of claim 21 wherein the at least one attachment portion of the stiffener includes a first flange portion attached to the first face sheet, wherein the stiffener further includes a cap portion and a second flange portion, the cap portion being offset from the first flange portion and attached to the second face sheet, the second flange portion being offset from the cap portion and spaced apart from the first flange portion, and the second flange portion being attached to the first face sheet, and wherein the fastener is a blind fastener extending through the cap portion of the stiffener.

25. The composite panel assembly of claim 21 wherein the first face sheet is a first arcuate panel, the second face sheet is a second arcuate panel, and the stiffener is an elongate straight member extending between the first and second face sheets, wherein the at least one attachment portion of the stiffener is bonded to the second face sheet, and wherein the part is an arcuate frame member extending adjacent to the second face sheet.

26. The composite panel assembly of claim 21 wherein the at least one attachment portion of the stiffener receives and engages the fastener to fixedly attach the part to the composite panel.

27. The composite panel assembly of claim 21 wherein the first face sheet, the second face sheet, and the stiffener include a graphite/epoxy material.

28. The composite panel assembly of claim 21 wherein the at least one attachment portion of the stiffener is adhesively bonded to the one of the first and second face sheets.

29. The composite panel assembly of claim 21, further comprising at least one adhesive layer disposed between the at least one core portion and one of the first and second face sheets, wherein the adhesive layer adhesively bonds the at least one core portion to the one of the first and second face sheets.

30. A composite panel assembly comprising:
a composite panel including:
  a first face sheet;
  a second face sheet offset from the first face sheet;
  at least one core portion extending between the first and second face sheets, wherein the at least one core portion includes a honeycomb material, and wherein the first and second face sheets include a graphite/epoxy material;
  a stiffener disposed between the first and second face sheets at least proximate to the at least one core portion, the stiffener having at least one attachment portion attached to one of the first and second face sheets;
a part positioned at least proximate to the composite panel and adjacent to the stiffener; and
at least one fastener engaging the part and extending through one of the first and second face sheets and the stiffener, wherein the at least one fastener engages the stiffener to attach the part to the composite panel.

31. A composite panel comprising:
a first face sheet;
a second face sheet offset from the first face sheet;
a stiffener disposed between the first and second face sheets, the stiffener having a first attachment portion attached to the first face sheet, a second attachment portion attached to the second face sheet, and an intermediate portion extending between the first and second attachment portions;
a first core portion positioned between the first and second face sheets on a first side of the stiffener, wherein at least a first portion of the stiffener contacts the first core portion; and
a second core portion positioned between the first and second face sheets on a second side of the stiffener opposite to the first side of the stiffener, wherein at least a second portion of the stiffener contacts the second core portion, and wherein the stiffener defines an open passageway extending between the first and second core portions.

32. The composite panel of claim 31 wherein the stiffener further includes a third attachment portion attached to the first face sheet, the third attachment portion being offset from the second attachment portion and spaced apart from the first attachment portion.

33. The composite panel of claim 31 wherein the first face sheet is a first arcuate panel, the second face sheet is a second arcuate panel, and the stiffener is an elongate straight member extending between the first and second face sheets.

34. The composite panel of claim 31 wherein the second attachment portion is configured to receive and engage a fastener to fixedly attach a part to the composite panel.

* * * * *